United States Patent [19]

Puzsik

[11] Patent Number: 5,208,981
[45] Date of Patent: May 11, 1993

[54] DRIVE SHAFT SUPPORT

[76] Inventor: Bela Puzsik, 3325 Archwood Dr., Rocky River, Ohio 44116

[21] Appl. No.: 299,030

[22] Filed: Jan. 19, 1989

[51] Int. Cl.$^5$ .............................................. B29C 45/14
[52] U.S. Cl. ................................ 29/898.07; 29/527.1; 264/263; 264/267
[58] Field of Search .......... 29/149 S NM, 458, 897.02, 29/898.07, 898, 527.1, 527.4; 248/634, 580, 635; 264/267, 269, 262, 263

[56] References Cited

U.S. PATENT DOCUMENTS

| 2,697,010 | 12/1954 | Hirschmugl | 264/269 X |
| 2,779,641 | 1/1957 | Sutowski | 29/898.07 X |
| 3,608,049 | 9/1971 | Tavella | 264/262 X |
| 3,904,731 | 9/1975 | Orkin et al. | 364/263 X |
| 4,852,230 | 8/1989 | Yu | 29/898.07 |

Primary Examiner—Joseph M. Gorski
Attorney, Agent, or Firm—Renner, Otto, Boisselle & Sklar

[57] ABSTRACT

A drive shaft support, and a method for making the same, which support may be used as a vehicle drive shaft support and bearing assembly. The shaft support has an outer two part metal bracket surrounding the support and an annular cup member embedded in an elastomer portion of the support closely adjacent a center opening. An elastomer such as rubber is vulcanize bonded to the bracket and the cup, forming a single bonded unit. To make the center support the bracket parts and cup are phosphated. The two separate parts of the outer bracket are preassembled and then loaded into vulcanizing mold parts, such bracket parts forming the periphery of the mold cavity. A piloting core positions the cup within the assembled bracket and also controls the thickness of the rubber bonding to the cup inner diameter. The piloting core also forms the axis of the center opening and cup at a precise dimension with respect to a mounting hole in the bracket for proper installation. Rubber is injected into the die and is vulcanize bonded to the bracket and the cup. After the molding process is completed, a bearing is press fit into the center hole of the vulcanized unit.

13 Claims, 4 Drawing Sheets

DRIVE SHAFT SUPPORT

This invention relates generally to a drive shaft support and more particularly to a vulcanize bonded drive shaft support and bearing assembly and a method for making the same.

BACKGROUND OF INVENTION

Drive shaft supports are most commonly used to mount rolling contact bearing assemblies. A typical application would be a drive shaft center support assembly for a two or four wheel drive vehicle.

Center supports for such drive shafts usually have a two part outer metal bracket assembly surrounding the support. The major bracket part is normally U-shape and is assembled with a straight bracket part. The bracket parts enclose the rubber portion of the support assembly into which the bearing and retaining parts are press fit. In order to retain the rubber part against axial movement the bracket parts are channel shape in transverse section. This greatly increases the cost of the bracket parts, particularly the major U-shape bracket part.

When the shaft support is assembled it is secured by fasteners to the underside of the vehicle frame with the straight bracket part against the frame. It is important that the center of the bearing and thus the drive shaft be precisely located since the shaft has to be connected through universal joints to the transmission and differential. The positioning of the support is usually done from one of the fasteners thus requiring that the dimension from that fastener hole in the bracket to the center of the bearing be precisely held. This is difficult to do where the rubber part and the bracket and bearing retainers are separately formed and assembled.

Also, when the parts are separately formed and assembled as indicated there is a tendency for the parts in use to vibrate or move with respect to each other, and the outer race of the bearing may tend to move or rotate with respect to the rubber portion of the support. If this occurs premature failure may occur leading to problems with the entire drive train. The inability to hold the bearing center location tolerance simply makes the wear problems caused by vibration or rotation of the outer race worse.

It would therefore be desirable to provide a drive shaft support which would avoid the tolerance, vibration, or race rotation problems, and yet which would be easier and less expensive to produce.

SUMMARY OF THE INVENTION

A drive shaft support, and a method for making the same, which support may be used as a vehicle drive shaft support and bearing assembly. The shaft support has an outer two part metal bracket surrounding the support and an annular cup member embedded in an elastomer portion of the support closely adjacent a center opening. An elastomer such as rubber is vulcanize bonded to the bracket and the cup, forming a single bonded unit. To make the center support the bracket parts and cup are phosphated. The two separate parts of the outer bracket are preassembled and then loaded into vulcanizing mold parts, such bracket parts forming the periphery of the mold cavity. A piloting core positions the cup within the assembled bracket and also controls the thickness of the rubber bonding to the cup inner diameter. The piloting core also forms the axis of the center opening and cup at a precise dimension with respect to a mounting hole in the bracket for proper installation. Rubber is injected into the die and is vulcanize bonded to the bracket and the cup. After the molding process is completed, a bearing is press fit into the center hole of the vulcanized unit.

These and other features of the invention are fully described and particularly pointed out in the claims. The following descriptive annexed drawings set forth in detail certain illustrative embodiments of the invention. However these embodiments are indicative of but a few of the various ways in which the principles of the invention may be employed.

DESCRIPTION OF THE PREFERRED EMBODIMENTS

Figure 1:
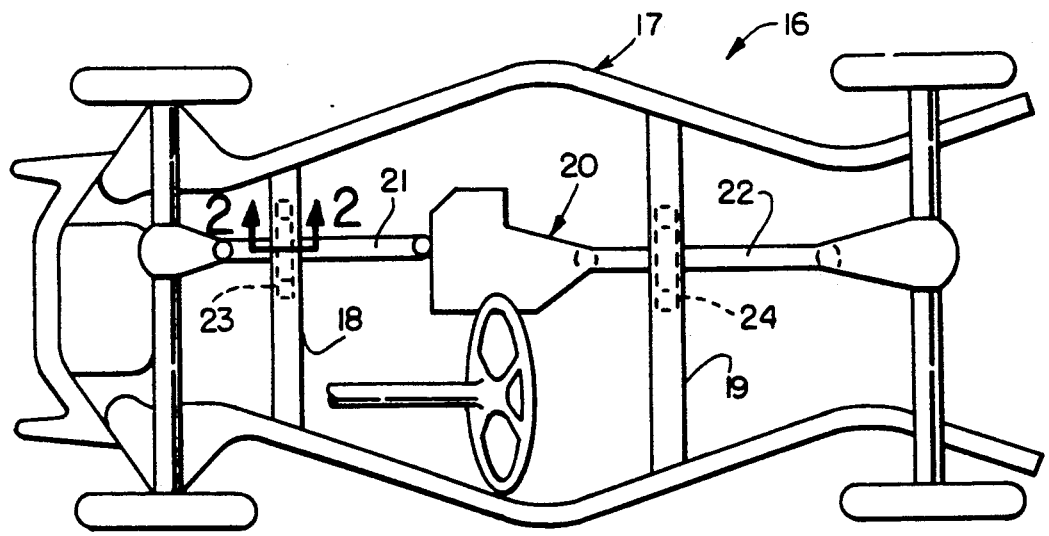
FIG. 1 is a schematic illustration of a four-wheel drive vehicle showing the location of the drive shaft supports.

Referring initially to FIG. 1 there is illustrated a four wheel drive vehicle shown generally at 16 which includes a frame 17 having two transverse frame members 18 and 19. The vehicle includes a transmission 20 which is connected by drive shafts 21 and 22 through the usual universal joints to the front and rear wheels as illustrated. Between the universal joints the drive shafts are supported by drive shaft supports shown generally at 23 and 24 in accordance with the present invention, such supports being secured to the underside of the transverse frame members 18 and 19.

Figure 2:
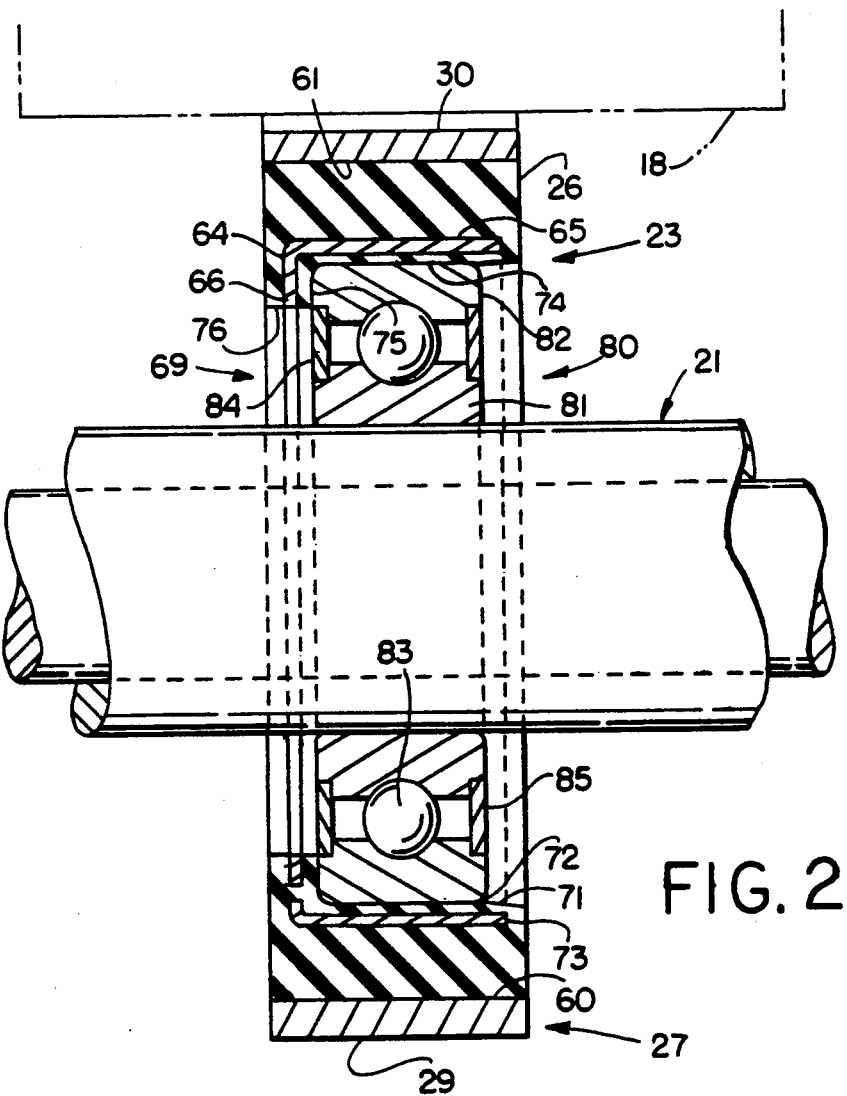
FIG. 2 is an enlarged vertical section of a support taken on line 2—2 of FIG. 1.
Figure 3:
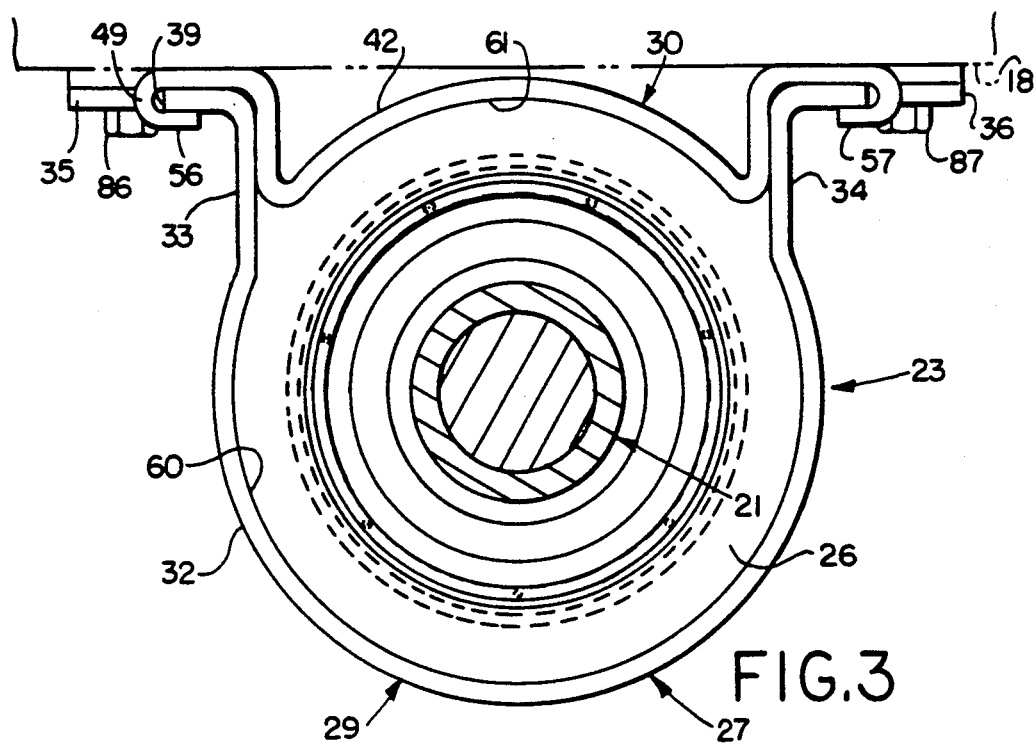
FIG. 3 is an axial elevation of the support seen in FIG. 2.
Figure 4:
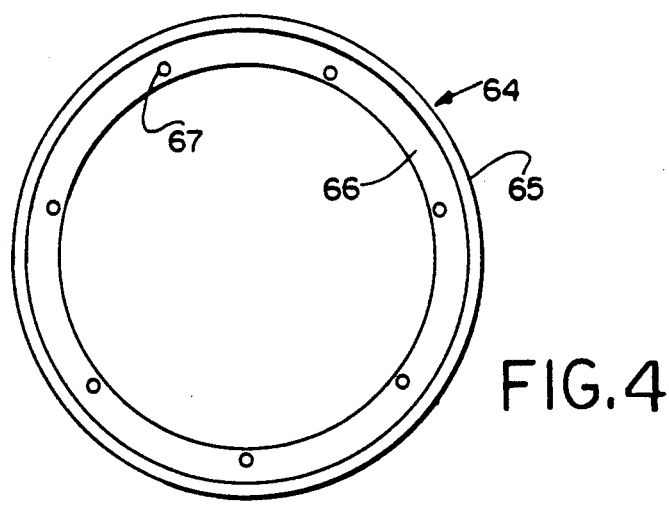
FIG. 4 is an axial elevation of the inner cup.

Referring now to FIGS. 2 and 3 there is illustrated the drive shaft support 23. The drive shaft support comprises an annular body of elastomeric material 26 which is surrounded by bracket assembly 27. As seen more clearly in FIG. 3 the bracket assembly includes two parts 29 and 30 which interfit to surround the elastomeric body 26. Both parts are stamped from metal stock of uniform rectangular transverse section. The part 29 as seen in FIG. 3 has a general omega-shape which includes a circular portion of major extent 32, parallel legs 33 and 34 which terminate in coplanar flanges or tabs 35 and 36, respectively.

Figure 7:
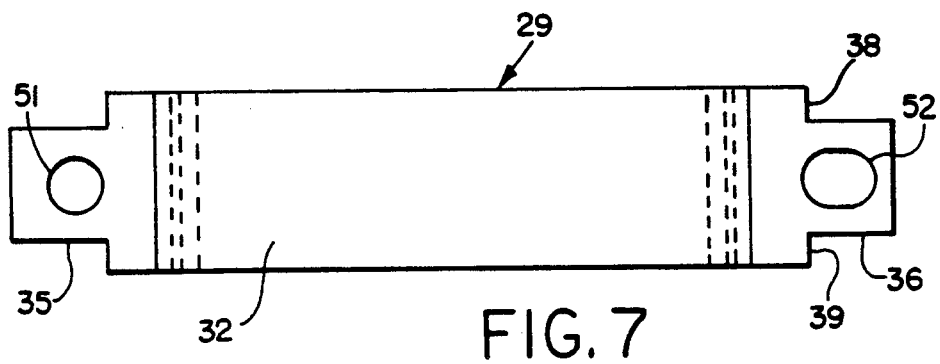
FIG. 7 is a bottom view of the lower bracket part.

As seen more clearly in FIG. 7 the corners of such tabs are each notched providing a right angle stepped edge as seen at 38 and 39.

The bracket part 30 includes a circular portion 42 of minor circular extent which extends between parallel legs 43 and 44, such legs terminating in coplanar flanges or tabs 45 and 46, respectively. The side edges of each tab are slit from the end and the slit portion is bent as seen at 48 and 49 initially to extend generally perpendicular to the plane of the tab.

Figure 5:
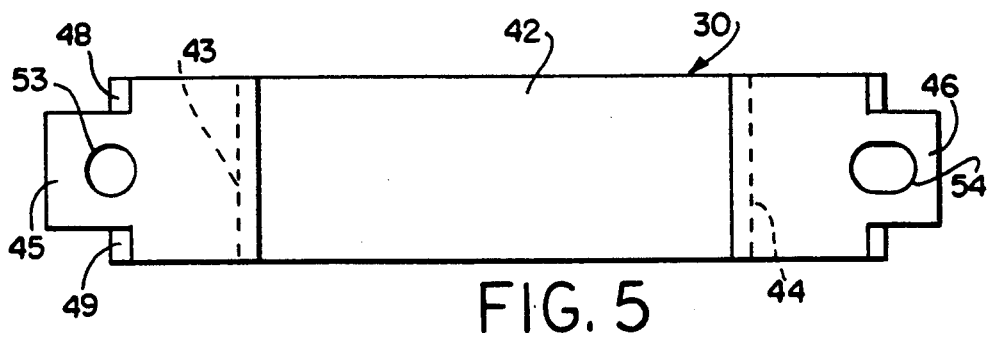
FIG. 5 is a bottom view of the upper or shorter bracket part with its tabs partially bent prior to assembly.
Figure 6:
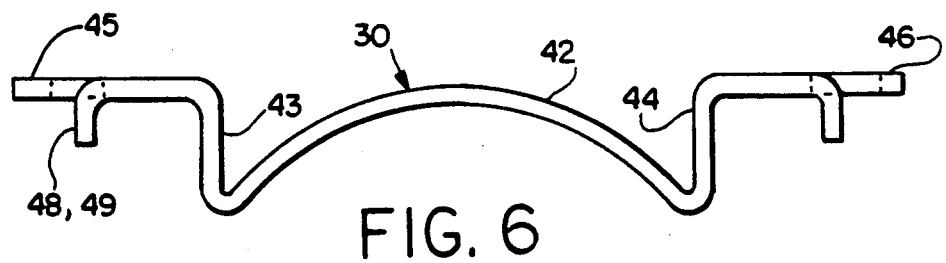
FIG. 6 is a side elevation of the upper bracket part.

As seen in FIG. 7 the tabs 35 and 36 of the bracket part 29 are provided with a circular hole 51 and a somewhat elongated hole 52, respectively. Similarly, the tabs 45 and 46 of the bracket part 30 are provided with a hole 53 and a somewhat elongated hole 54, respectively, as seen in FIG. 5.

To assemble the two bracket parts the bracket 30 is positioned such that the legs 43 and 44 are inside the legs 33 and 34 of the bracket part 29 with the respective tabs or flanges abutting each other. The bent portions 48 and 49 are then folded back on top of the edges of the tabs 35 and 36 around the stepped edges 38 and 39 as seen at 56 and 57 in FIG. 3. In such assembled condition the holes 51 and 53 are aligned as are the holes 52 and 54. When assembled the top surfaces of the tabs 45 and 46 are close to adjacent the circle of the bracket.

As hereinafter described, the elastomeric body is bonded in the molding process to the interior cylindrical surfaces 60 and 61 of the bracket parts 29 and 30, respectively.

Also bonded to and embedded within the elastomeric body is a metallic cup 64. The cup includes an axially extending cylindrical skirt 65 and an inwardly extended flange 66 which may be provided with a series of axially extending holes 67.

As seen more clearly in FIG. 2 the elastomeric body 26 includes an axially extending shouldered through-hole shown generally at 69. The larger end of the hole is provided with a tapered or pilot surface 71 which extends from the edge of the elastomeric body to the position 72 which is both radially and axially within the end 73 of the cup skirt. The hole then extends cylindrically as indicated at 74 to shoulder 75. The shoulder 75 extends radially inwardly at right angles to the axis of the drive shaft support. From the shoulder the through-hole continues to the opposite end of the elastomeric body at a reduced diameter as indicated at 76.

The flange 66 of the cup parallels the shoulder 75 and is spaced therefrom while the skirt 65 of the cup parallels the cylindrical portion 74 at a somewhat smaller spacing.

Press fit into the shoulder through-hole against the shoulder 75 is a bearing shown generally at 80 which comprises an inner race 81, an outer race 82 and a series of ball bearings 83. Annular seals 84 and 85 extend between the inner and outer races. The inner race is mounted on the drive shaft 21 while the outer race is fixed by the press fit of the bearing into the shoulder through-hole. The drive shaft support is secured to the underside of the frame member 18 by fasteners 86 and 87 seen in FIG. 3.

Figure 8:
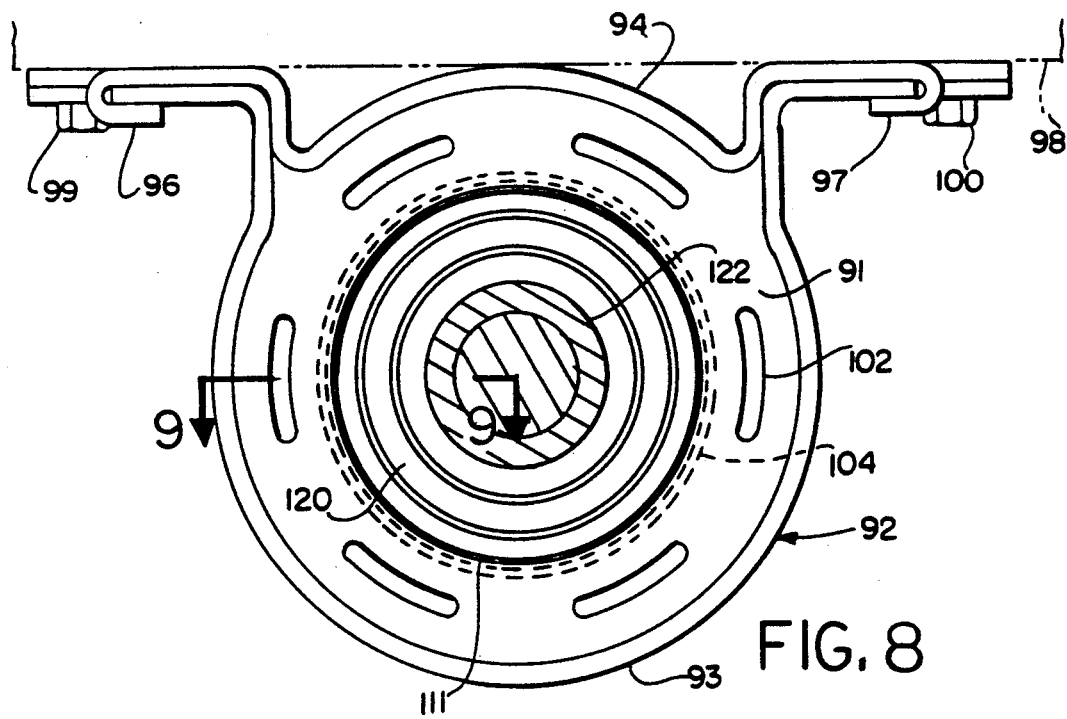
FIG. 8 is an axial elevation of a further embodiment of the invention.
Figure 9:
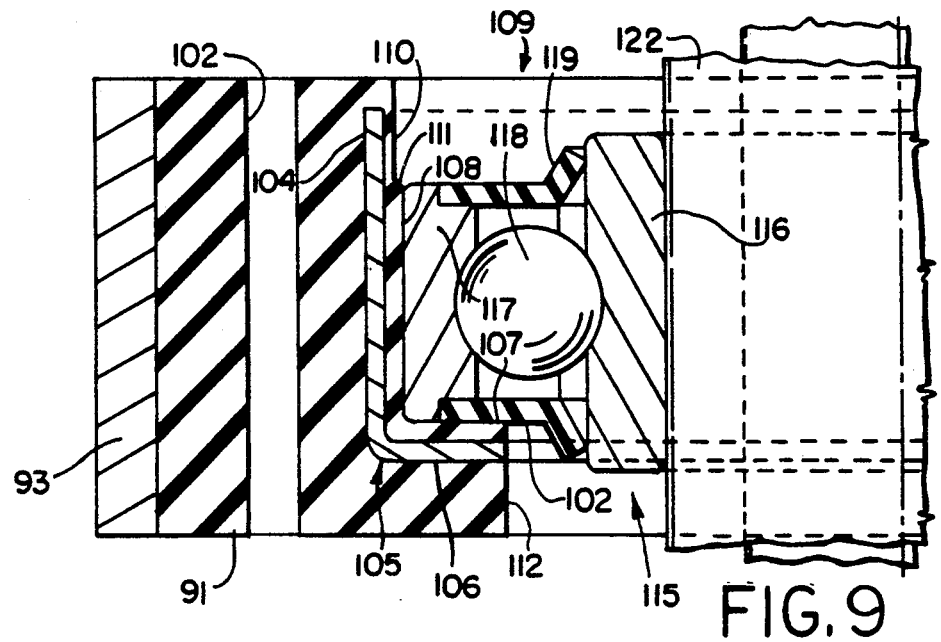
FIG. 9 is a fragmentary quarter section taken on line 9—9 of FIG. 8.

Referring now to FIGS. 8 and 9 there is illustrated a drive shaft support of a somewhat larger size and of a slightly modified design. The drive shaft support shown generally at 90 includes elastomeric body 91 surrounded by bracket assembly 92 which includes the omega-shape bracket part 93 which has a center portion of major circular extent and the generally straight bracket part 94 which includes a center portion of minor circular extent, the latter fitting between the legs of the part 93. The overlapping tabs are clenched together as illustrated at 96 and 97 and the entire drive shaft support is secured to frame 98 by the fasteners seen at 99 and 100.

In order to provide additional transaxial cushioning the elastomeric body 91 is provided with a series of through circular slots seen at 102. As illustrated, there are six such circular slots equally circumferentially spaced. The slots are positioned radially between the surrounding bracket assembly and the skirt 104 of embedded cup 105.

The cup 105 includes a flange 106 with the flange and skirt being fairly closely but uniformly spaced from the radially extending shoulder 107 and cylindrical portion 108 of the shouldered through-hole shown generally at 109. The larger end of the through-hole is provided with a cylindrical portion 110 which extends well within the axial end of the skirt. There is then provided a relatively short inwardly tapering pilot surface 111 and from the pilot surface the hole continues along the cylindrical portion 108 to the stop shoulder 107. From the stop shoulder 107 the through-hole continues through the drive shaft support at the reduced diameter indicated at 112.

The bearing shown generally at 115 is press fit into the shouldered through-hole and includes inner race 116, outer race 117 separated by a series of balls 118, and sealed as indicated at 119 and 120. The relatively short pilot surface 111 facilitates the press fitting of the bearing into the shouldered through-hole. The race 116 is mounted on the shaft 122 while the race 117 is secured against rotation by the press fit of the bearing into the shouldered through-hole. It is noted that the pilot surface 111 is entirely axially within the skirt 104 of the cup 105. Like the cup of the FIG. 3 embodiment, the flange 106 may be provided with a series of holes to promote the flow of elastomeric material to both sides of the cup in the mold when the drive shaft support is formed.

Figure 10:
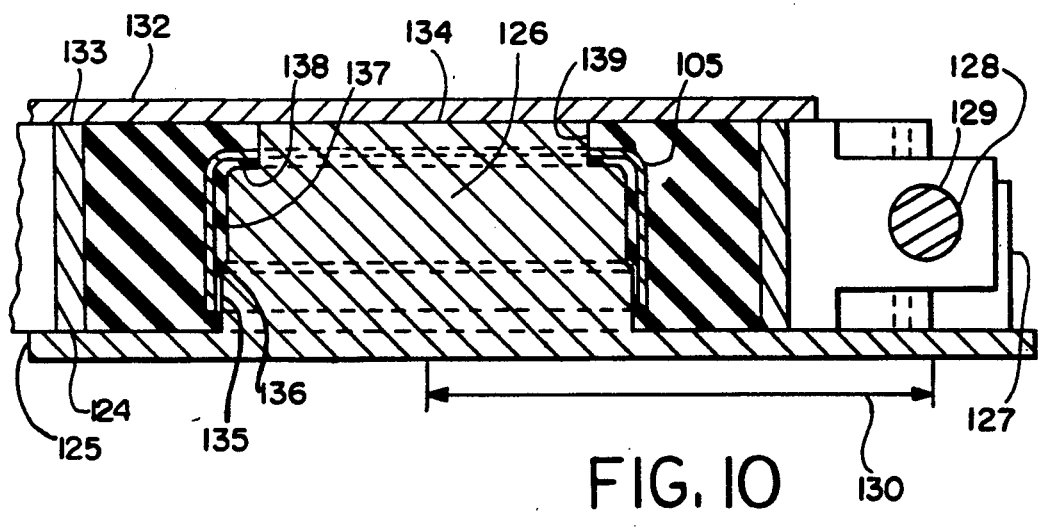
FIG. 10 illustrates the molding process of the present invention.

Referring now to FIG. 10 there is illustrated a method of making the drive shaft support of the present invention. The metal parts of the drive shaft support which include the two bracket parts and the cup are phosphated by treating in a phosphate bath to prepare the surfaces thereof for the molding operation. The bracket parts are then assembled and placed with their edges 124 against mold part 125. The mold part 125 includes a central piloting core 126 which forms the shouldered through-hole. The mold part may also include a bracket 127 which includes a horizontally extending retractable pilot pin 128 which may fit in the round fastening hole of the bracket tabs as indicated at 129. The mold part 125 then holds the dimension between the center of the hole 129 and the axis of the through-hole formed by the core 126, such dimension being indicated at 130. The noted dimension is critical to the proper assembly and operation of the drive shaft support. Prior to placing in the mold the bracket halves are assembled by the clenching operation and the proper placement in the mold ensures the proper tolerance on the dimension 130. Other shoulders or stops may of course be employed to gauge and ensure the dimension 130.

The cup 105 is then loaded onto the piloting core 126. The cup may be positioned by engagement of the flange with slight projections on the reduced diameter of the piloting core. When the cup is in proper position, such proper position controls the thickness of the rubber bonded to the cup internal diameter. The die cavity is closed by mold part 132 which is clamped against the bracket part edges 133 and of course against the end 134 of the piloting core. Rubber is then injected into the mold cavity and vulcanized to be vulcanize bonded to the bracket parts and the cup resulting in a unitary vulcanize bonded assembly.

As indicated in FIG. 10 the piloting core includes cylindrical surface 135, short tapered pilot surface 136, cylindrical surface 137, radial shoulder surface 138, and reduced diameter cylindrical surface 139 which form the surfaces 110, 111, 108, 107 and 112 respectively in the drive shaft support assembly through-hole.

After vulcanizing the gauge pin 129 is released and the parts separated so that the unitary bonded assembly may be removed from the mold. The bearing is then press fit into the shouldered through-hole to complete the assembly operation.

The holes 102 of the FIG. 8 embodiment may be formed by discrete cores extending between the mold parts.

Since the bracket parts do not include any edge flanges or channel shape configurations, the manufacture of the drive shaft support is not only economical but ensures that the proper assembly dimension 130 may be held. Moreover, the employment of the embedded cup ensures that when press fit into the shouldered through-hole is held against relative vibration or rotation. In the molding process the bracket parts not only may readily be gauged, but also act as the peripheral containment mold part for the injected and vulcanized rubber.

A preferred rubber is synthetic rubber such as polychloroprene although it will be appreciated that other elastomeric materials such as urethane rubbers may be employed.

Although the invention has been shown and described with respect to certain preferred embodiments, equivalent alterations and modifications will be obvious to others skilled in the art upon the reading and understanding of this specification. The present invention includes all such equivalent alterations and modifications, and is limited only by the scope of the following claims.

What is claimed is:

1. A method of making a drive shaft support comprising the steps of forming a first bracket part and a second bracket part; providing one of said bracket parts with a mounting hole; assembling the bracket parts to form a two-part generally annular bracket, closing said bracket parts between vulcanizing mold parts, which include a pilot core having a center extending between said vulcanizing mold parts, centered within said bracket, fixing with precision the distance between the bracket parts and the center of said pilot core, injecting rubber into the vulcanizing mold parts between the bracket and pilot core with the pilot core forming a hole in the injected rubber, and vulcanizing the rubber to cause it to bond to the bracket parts, opening the vulcanizing mold parts, and press fitting a bearing into the hole formed by said pilot core.

2. A method as set forth in claim 1 wherein one of said bracket parts is omega-shape and includes flanged legs and a center portion of major circular extent, the other of said bracket parts being generally straight but including a center portion of minor circular extent fitting between the legs of said one part with the circular center portion of said one part complementing the center portion of said other part to form the annular bracket, and assembling said bracket parts as aforesaid before closing said bracket parts between the mold parts.

3. A method as set forth in claim 2 wherein said bracket parts are formed from rectangular in section metal stock of uniform width having unformed edges, said mold parts comprising mold plates clamping the edges of such bracket parts.

4. A method as set forth in claim 3 including the step of mechanically assembling said bracket parts as aforesaid.

5. A method as set forth in claim 2 including the step of folding tabs on the other of said bracket parts over the flanged legs of said one of said bracket parts thus mechanically to connect said bracket parts.

6. A method as set forth in claim 2 wherein said pilot core provides a shoulder in the hole formed by the pilot core against which said bearing is press fitted.

7. A method as set forth in claim 1 wherein said fixing with precision step is accomplished by the closing of said vulcanizing mold parts.

8. A method of making a rubber bonded drive shaft support comprising the steps of forming a first bracket part and a second bracket part; providing one of said bracket parts with a mounting hole; assembling the bracket parts to form a two-part generally annular bracket, closing said bracket parts between vulcanizing mold parts, which include a pilot core having a shoulder and extending between said vulcanizing mold parts, centered within said bracket, positioning a cup on said pilot core before said vulcanizing mold parts are closed, said cup including a skirt and a flange, both being closely spaced inwardly from the shoulder on the pilot core, injecting rubber into said vulcanizing mold parts between the bracket parts and pilot core to embed the cup within the rubber and with the pilot core forming a hole in the injected rubber, and vulcanizing the rubber to cause it to bond to the cup and bracket parts, opening said vulcanizing mold parts, and press fitting a bearing into the hole formed by said pilot core.

9. A method as set forth in claim 8 wherein said bracket parts and cup are treated in a phosphate bath to facilitate vulcanize bonding.

10. A method as set forth in claim 8 wherein said pilot core includes a tapered surface to form a tapered pilot surface in the hole formed thereby to facilitate the press fit of said bearing.

11. A method as set forth in claim 10 wherein said tapered pilot surface is axially within the skirt of said cup.

12. A method as set forth in claim 10 wherein said tapered pilot surface commences at one end of the hole formed by said pilot core and extends to a position radially within the skirt of said cup.

13. A method as set forth in claim 8 wherein said vulcanizing mold parts include discrete cores extending axially within the bracket around the piloting core to form axial holes in the rubber of the support.

* * * * *